United States Patent
Beutter et al.

(10) Patent No.: US 7,377,519 B2
(45) Date of Patent: May 27, 2008

(54) SHIELDING COMPONENT, IN PARTICULAR A HEAT SHIELD

(75) Inventors: Ulrich Beutter, Reutlingen-Reicheneck (DE); Harald Stauber, Zirndorf (DE)

(73) Assignee: ElringKlinger AG, Dettingen/Erms (DE)

( * ) Notice: Subject to any disclaimer, the term of this patent is extended or adjusted under 35 U.S.C. 154(b) by 0 days.

(21) Appl. No.: 11/133,453

(22) Filed: May 20, 2005

(65) Prior Publication Data

US 2006/0219434 A1    Oct. 5, 2006

(30) Foreign Application Priority Data

Apr. 2, 2005  (DE) .................... 10 2005 015 246

(51) Int. Cl.
*F02F 11/00*  (2006.01)
*F16L 21/02*  (2006.01)

(52) U.S. Cl. ..................... 277/591; 277/602

(58) Field of Classification Search .......... 174/35 GC, 174/35 MS, 35 R, 52.1, 52.4, 2; 361/704, 361/719; 277/602, 598, 630, 591; 237/79

See application file for complete search history.

(56) References Cited

U.S. PATENT DOCUMENTS 3,904,379 A    9/1975  Oser
5,132,875 A *  7/1992  Plesinger ................ 361/704
5,463,529 A * 10/1995  Chia et al. .............. 361/704
5,566,052 A * 10/1996  Hughes ................... 361/704
5,791,660 A *  8/1998  Belter .................... 277/598
7,048,201 B2 * 5/2006  Kerchner et al. ............ 237/79

FOREIGN PATENT DOCUMENTS

| DE | 195 08 872 A1 | 9/1996 |
| DE | 693 04 642 T2 | 3/1997 |
| DE | 197 00 628 C2 | 7/1998 |
| DE | 102 47 641 B3 | 1/2004 |

* cited by examiner

*Primary Examiner*—Hung V Ngo
(74) *Attorney, Agent, or Firm*—Roylance, Abrams, Berdo & Goodman, L.L.P.

(57) ABSTRACT

A shielding component, in particular a heat shield, includes shield components (10, 12, 14) made flat, lying at least partially on top of one another, and connected to one another at least partially along at least one common connecting line (16). Since the shield components (10, 12) at least partially form a gasket (30) by at least one shield component (10) having a projection relative to its remaining superficial extent, a further function in the form of a sealing function is implemented in a heat shield for acoustic and heat insulation.

19 Claims, 2 Drawing Sheets

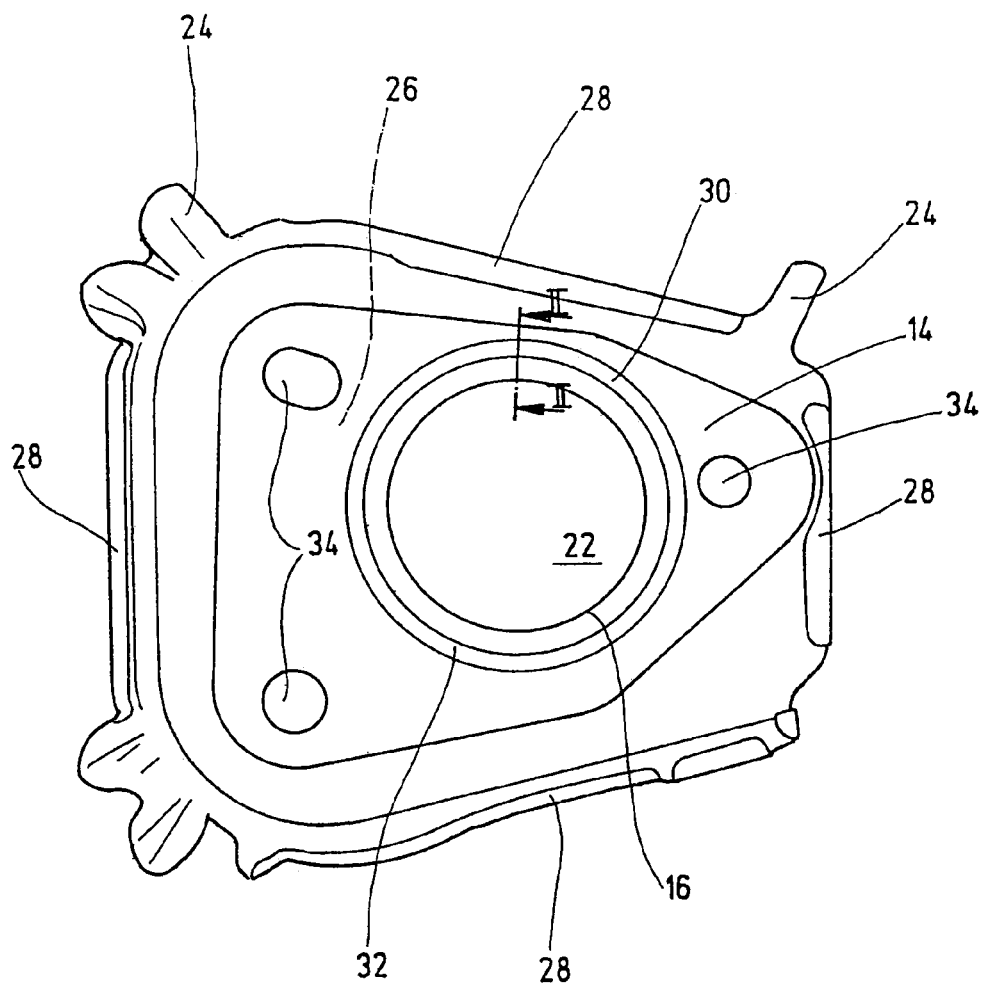
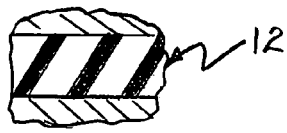
Fig. 2
Fig. 4

SHIELDING COMPONENT, IN PARTICULAR A HEAT SHIELD

REFERENCE TO RELATED APPLICATION

This application is related to U.S. patent application Ser. No. 11/133,451, entitled "Shielding Component, in Particular A Heat Shield" filed on May 20, 2005 in the names of Ulrich Beutter and Harald Stauber.

FIELD OF THE INVENTION

The present invention relates to a shielding component, in particular a heat shield, formed of shield components. The shield components are made flat, lie at least partially on top of one another and are connected to one another at least partially along at least one common connecting line.

BACKGROUND OF THE INVENTION

While heat development, for example of a high-economy, performance-optimized diesel engine, can be very low on the cylinder crankshaft housing, this low heat development in no way applies to "hot zones" such as manifolds, turbochargers, catalytic converters, etc. Due to the more and more compact construction of engines, components which are not thermally "compatible" are increasingly being placed in close proximity to one another. Accordingly, heat-sensitive assemblies, such as sensors, fuel lines, pressure cells, body parts, etc., must be protected against adjacent thermal engine components. The situation is exacerbated by the compact structure in that the high packing density of the assemblies constricts the cooling air flow in the engine compartment. Noise abatement measures can also contribute to this high packing density. Thus, for example, plastic bottom plates, designed to reduce the emission of noise from the engine compartment to the roadway, under certain circumstances can produce effective insulation with which heat is enclosed in the engine compartment. Catalytic converters, due to their phased high surface temperature, are considered to be among the heat sources which certainly may necessitate the use of protective shield barriers. One typical example of this need is design measures such as positioning the catalytic converter close by the manifold. This design principle, which performs the function of rapid heat-up of the catalytic converter reducing emissions in the cold start phase, shifts a major source of heat into the engine compartment, where numerous assemblies are crowded in a tight space. One reason for the growing importance of shielding components, such as heat shields, is the trend toward use of thermoplastics. The light and economical materials with their exceptional moldability are rapidly becoming common in the engine compartment, but require special attention with respect to ambient temperatures at the application site relative to other thermal engine parts ("New materials and development tools for heat protection", in MTZ Dec. 2001, Vol. 72, pp. 1044 ff).

EP-A-1 298 365 discloses a metallic cylinder head gasket with a gasket sheet, which has at least one combustion space opening as a through opening The gasket unit which has at least two layers of metal sheet. The first layer of metal sheet is provided with at least one bead which is elastically deformable vertically and which encloses the combustion space opening. The second layer of metal sheet is provided with at least one deformation limiting device which encloses the combustion space opening and which limits deformation of the bead.

WO 01/96768 discloses a cylinder head gasket made as a flat gasket with at least one metallic layer in which at least one through opening (combustion space opening) is formed. It or at least one of the metal layers is made at least in particular areas in the form of corrugated or sawtooth profiling around the respective combustion space opening. At least the layer in which the profiling is made due to the required very high elasticity limits, has to be formed of a spring steel. The profiling has a deformation limitation device for an additionally formed bead.

In the known solutions described above, heat-insulating or acoustic-insulating component shielding and sealing of fluid-carrying installation spaces, also in gaseous form, are effected separately from one another. This separation means that shielding components in the form of heat shields perform the function of an independent component for acoustic and heat insulation. Optionally, multilayer sheet metal gasket structures are used especially in the area of cylinder head configurations to seal the fluid-carrying spaces. The known solutions are therefore characterized by a corresponding diversity of parts, resulting in increased production and installation costs.

SUMMARY OF THE INVENTION

An object of the present invention is to provide a shielding component, in particular a heat shield, which helps cut costs with multifunctional applications.

This object is achieved by a shielding component with shield components at least partially forming a gasket by at least one shield component having a projection relative to its remaining superficial extent. In a heat shield for acoustic and heat insulation, another function is implemented in the form of a sealing function. With only one shielding component, a multiple function is ensured in an economical manner, at least within the indicated scope. With the shielding component of the present invention, it is possible for the first time to provide a conventional, even multi-layer heat shield with a gasket which helps seal fluid passage in hot areas by the shielding component. By preference, the sealing projection of at least one shield component is made as an annular gasket which encloses the passage opening in the form of a combustion space opening passing through all shield components equally.

In one especially preferred embodiment of the shielding component of the present invention, along the common connecting line at least one shield component encompasses another shield component in an overlap. Preferably, within this overlap, the shield components are held by frictional engagement so as to be displaceable against one another relative to a compensation distance. A rigid connection of the shield components with their individual layers is avoided. Depending on the thermal situation, they can mutually "slide" off one another, without the connection being adversely affected along the common connecting line. Based on the allowed displacement motion of the shield components relative to one another, thermal bulging effects are avoided. Also, the shield components no longer tear, not even in the area of their attachment to other machine or vehicle parts. Since in any thermal situation in any fixing state the frictional connection of the shield components with the displacement possibility is maintained, the shielding component of the present invention can also be used in such thermally stressed zones, for example directly in the gasket area of the cylinder head gasket, where previous use of the pertinent shield components as a heat shield was not possible. The gasket used is fully maintained with its sealing function in the sense of a stationary gasket, even if the shield components and their layers should move relative to one another due to heat to cause positional compensation.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is a bottom view of the heat shield of FIG. 1;

FIG. 4 is a partial side elevational view in section of the middle shield component of the heat shield of FIG. 1.

DETAILED DESCRIPTION OF THE INVENTION

Figure 1:
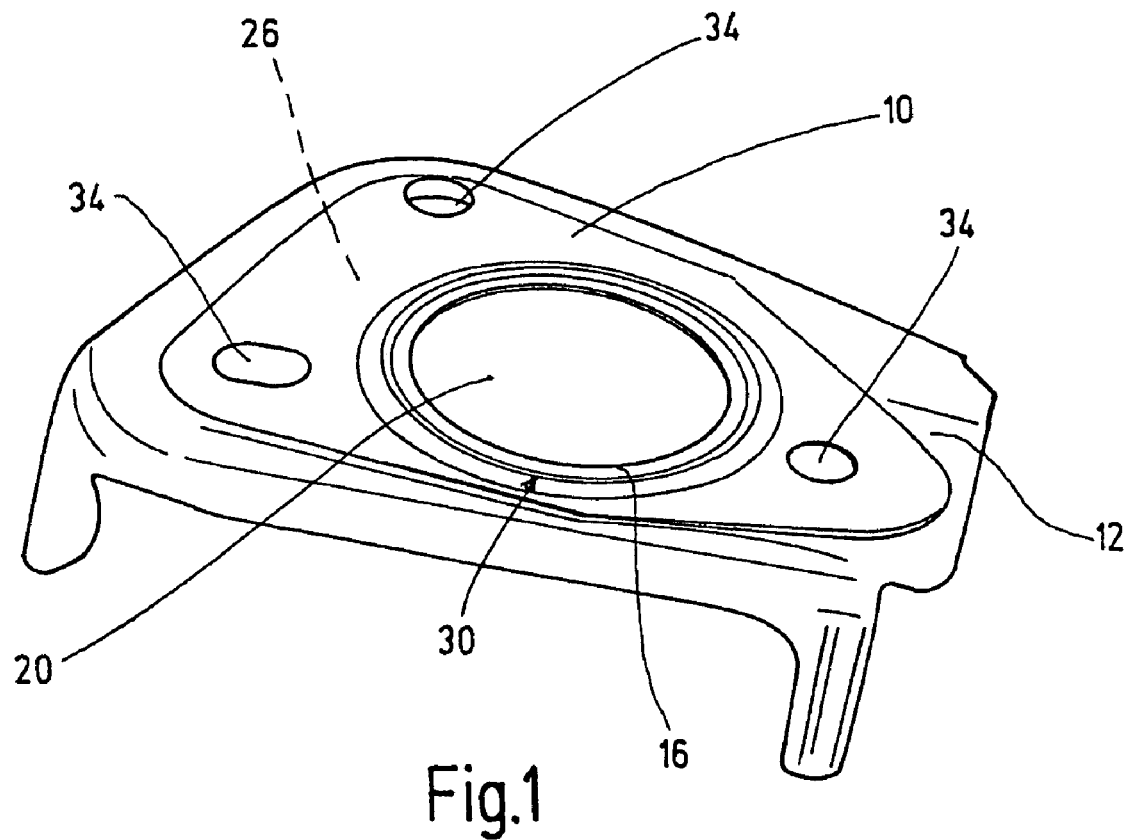
FIG. 1 is a perspective view of a heat shield according to an embodiment of the present invention.

A shielding component according to the present invention is made, in particular, as a heat shield and has, at least in the middle area, individual shield components 10, 12, 14 lying partially flat on top of one another. These shield components 10, 12, 14 are connected to one another along a common connecting line 16. Along this common connecting line 16, the bottom shield component 14 shown in FIG. 2 encompasses the middle shield component 12 and the top shield component 10 on the edge side in an overlap 18 (compare FIG. 3). The overlap 18 is produced, in particular, by the bottom shield component 14 along an interior circumferential side end or edge being turned down with its free edge around a definable edge mounting 20. This edge mounting 20 determining essentially a defined compensation distance, by which the shield components 10, 12, 14 are movably held by frictional engagement against one another to compensate for thermally occurring expansions, at least in the area of the connection.

As illustrated in the drawing figures, the connecting line 16 extends in an arc and encompasses a round passage opening 22. Opening 22 passes through all shield components 10, 12, 14, and is used for possible passage of the fluid flow, which can also be gaseous.

The middle shield component 12 is bordered in the middle area by the two shield components 10, 14, and is preferably made as a formed sheet metal part. The covering surfaces 24 of middle shield component 12 are bent at least partially on the edge side in the manner of a covering cap, and surfaces 24 contribute at the same time to ensuring thermal and/or acoustic insulation. The middle shield component 12 has several layers, especially two or three layers. For the three-layer structure, two sheet metal cover layers are able to accommodate between them an insulating intermediate layer which is not described in detail and in this way overlap it. The structure of such heat shields is conventional and is described for example in DE 10 2004 030 621 which was published subsequently, so that it will not be described in detail here. So that the two sheet metal cover layers of the middle shield component 12 hold fast to one another, provision is made on the exterior circumferential side such that the top sheet metal cover layer at least partially covers the lower sheet metal cover layer by means of flanging 28. For the sake of easier representation, the flanging is only partially reproduced in FIG. 2. The two external shield components 10, 14 are formed essentially from the same flat sheet metal shapes and, especially in the installed state of the shielding component, lie flat along the respective contact surfaces 26 against the middle shield component 12. In all directions, middle shield component 12 has a greater extension than the exterior circumferential edge of the respective shield components 10, 14 forming the boundary for these shield components.

As the figures furthermore show, the overlap 18 takes place along the connecting line 16 forming the passage opening 22. In addition to the overlap 18 shown especially in FIG. 3, the shield components 10, 14 form an annular gasket 30 by an axial projection 32 produced by impressing an annular bead relative to their remaining flat extension (compare FIG. 3). Depending on the desired sealing function and configuration of the gasket, projections 32 can be radially offset relative to one another or provided only one shield component 10, 14 with a projection 32. For the sake of greater simplicity of illustration, in FIG. 3 the middle shield component 12 is shown as having only one layer. Fundamentally, the pertinent configuration of the shield components 10, 12, 14 with a total of only three sheet metal layers is possible. Likewise, a configuration in which only two shield components 10, 12 form the shielding component is possible.

Figure 3:
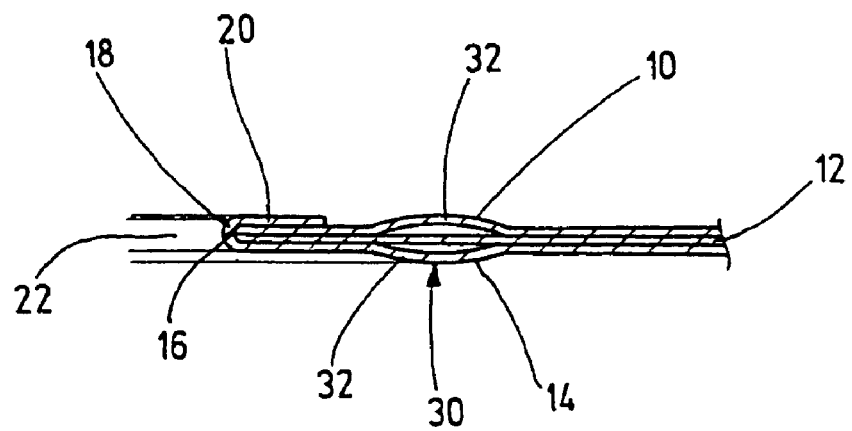
FIG. 3 is a partial side elevational view of the heat shield in section taken along line II-II of FIG. 2.

Based on the cited frictional connection of the individual shield components 10, 12, 14 to one another, even under thermal stress, the positions of the shield components relative to one another is maintained. The gasket 30 can perform its function in operation, even under high thermal stress. Since the respective projection 32 forming the gasket 30 is an integral component of the shield component 10 and of the shield component 14, in the installed state of the shielding component, the middle shield component 12 remains in its installation position. Relative to this stationary installation position, the two shield components 10, 14 connected to one another are displaced in the same respective directions. Since the overlap 18 in the area of the edge mounting 20, as shown in FIG. 3, has four layers, and regardless of the number of layers with respect to the flanging with the bottom shield component 14, the overlap always has one layer more than the layer combination in the area of the gasket 30. Overlap 18 achieves a stopper function for the gasket 30. It cannot be axially compressed when exposed to stress and relinquish the sealing function, since the possible compression process is limited by the thickness of the individual layers in the stopper region of the overlap 18, defined by the maximum thickness range. In this way the shielding component of the present invention could also be used as a cylinder head gasket with a heat shielding action. Preferably, the annular gasket 30 encloses the overlap 18 with its edge mounting 20 at the same radial distance. The gasket 30 could also be made differently, for example, such that several washers 30 in a concentric configuration encompass the fluid passage opening 22 (combustion space opening).

The individual shield components 10, 12, 14 congruently have further passage openings 34, each in the form of an elongated hole. Passage openings 34 are used to fix the shielding component on engine or machine components by conventional fixing means, such as screws.

With the present invention, it is ensured that individual attachment points do not unintentionally detach from the shielding component or that cracks cannot form on the shielding component as a result of thermal stresses. Based on the possible displacement motion of the individual layers, the sealing function is safeguarded by the gasket 30 in any working situation. In this way, reliable sealing of the passage opening 22 for the purpose of static sealing is achieved. The fluid flow which is to be controlled retains its fluid guidance and cannot emerge into the environment.

While one embodiment has been chosen to illustrate the invention, it will be understood by those skilled in the art that various changes and modifications can be made therein without departing from the scope of the invention as defined in the appended claims.

What is claimed is:

1. A heat shield for motor components, comprising:
   first, second and third shield components stacked one on another with said second shield component being between said first and third shield components;
   a common connecting line along, which said shield components are at least partially connected together;
   an annular gasket formed by a projection on at least one of said first and third shield components extending from a remaining superficial extent thereof;
   a passage opening encompassed by said annular gasket and extending through said first, second and third shield components; and
   one of said first and third shield components encompassing the others of said shield components along said common connecting line in an overlap.

2. A heat shield according to claim 1 wherein said connecting line extends along an arc.

3. A heat shield according to claim 1 wherein said overlap comprises at least one more layer of said shield components than said annular gasket.

4. A heat shield according to claim 1 wherein said projection is adjacent to said overlap; and said overlap is annular.

5. A heat shield according to claim 4 wherein said gasket surrounds said overlap at a constant radial distance.

6. A heat shield according to claim 1 wherein said second shield component is provided with cover surfaces bent at least partially on a side edge thereof; and
   said first and third shield components have similar shapes, and hold said second shield component therebetween along common contact surfaces.

7. A heat shield according to claim 6 wherein said second shield component has several layers; and said first and second shield components are each a single layer of sheet metal.

8. A heat shield according to claim 7 wherein said second shield component has an insulating intermediate layer.

9. A heat shield according to claim 1 wherein said overlap extends along said common connecting line by said third shield component encompassing said second and first shield components.

10. A heat shield according to claim 1 wherein said shield components are held within said overlap by frictional engagements allowing displacement relative to one another in a compensation distance.

11. A heat shield according to claim 1 wherein additional passage openings extend congruently through said shield components.

12. A heat shield according to claim 1 wherein said projection is part of said first shield component and extends in a direction away from said second shield component.

13. A heat shield according to claim 12 wherein said third shield component includes another projection forming said gasket and extending in a direction away from said second shield component.

14. A heat shield according to claim 1 wherein said connecting line extends along said passage opening.

15. A heat shield according to claim 1 wherein each said shield component has a planar portion in direct contact with said planar portion on an adjacent one of said shield components.

16. A heat shield according to claim 1 wherein said overlap extends through said passage opening.

17. A heat shield according to claim 1 wherein said projection extends in a direction away from said second shield component.

18. A heat shield according to claim 1 wherein said projection comprises first and second projections extending from said first and third shield components, respectively, in directions away from said second shield component.

19. A heat shield according to claim 1 wherein said overlap extends through said passage opening and over a surface of the other of said first and third shield components remote from said second shield component.

* * * * *